United States Patent [19]

Levine et al.

[11] Patent Number: 4,719,193

[45] Date of Patent: Jan. 12, 1988

[54] PROCESSES FOR PREPARING POLYETHYLENE CATALYSTS BY HEATING CATALYST PRECURSORS

[75] Inventors: Isaac J. Levine; Frederick J. Karol, both of Belle Mead, N.J.

[73] Assignee: Union Carbide Corporation, Danbury, Conn.

[21] Appl. No.: 913,735

[22] Filed: Sep. 30, 1986

[51] Int. Cl.$^4$ .................................................. C08F 4/64
[52] U.S. Cl. .................................. 502/107; 502/112; 502/125; 502/126; 502/127; 526/125
[58] Field of Search ............... 502/107, 125, 127, 126, 502/112

[56] References Cited

U.S. PATENT DOCUMENTS

| | | | |
|---|---|---|---|
| 2,951,045 | 8/1960 | Gamble et al. | 502/107 |
| 3,558,271 | 1/1971 | Callacno | 502/107 X |
| 3,562,239 | 2/1971 | de Jong et al. | 502/107 X |
| 3,857,795 | 12/1974 | Van Der Bend et al. | 502/107 |
| 4,293,673 | 10/1981 | Hamer et al. | 526/88 |
| 4,302,565 | 11/1981 | Goeke et al. | 526/88 |
| 4,303,771 | 12/1981 | Wagner et al. | 526/125 |
| 4,354,009 | 10/1982 | Goeke et al. | 526/125 |
| 4,376,062 | 3/1983 | Hamer et al. | 502/9 |
| 4,379,758 | 4/1983 | Wagner et al. | 252/429 B |
| 4,379,759 | 4/1983 | Goeke et al. | 252/429 B |
| 4,382,018 | 5/1983 | Allan et al. | 502/107 |
| 4,383,095 | 5/1983 | Goeke et al. | 526/88 |
| 4,395,359 | 7/1983 | Wagner et al. | 252/429 B |
| 4,427,573 | 1/1984 | Miles et al. | 526/111 X |

*Primary Examiner*—Patrick P. Garvin
*Attorney, Agent, or Firm*—J. S. Piscitello

[57] ABSTRACT

Ethylene polymers are obtained in enhanced yield in a process for homopolymerizing ethylene or copolymerizing ethylene with an alpha-olefin having 3 to 8 carbon atoms employing a catalyst system comprising (a) a solid titanium (III)-containing precursor, and (b) an organoaluminum activator, by heating the titanium (III)-containing precursor, prior to activating with the organoaluminum activator, at a temperature of 140°–200° C. for a sufficient time to reduce the electron donor level of the precursor from at least about 20 percent to about 80 percent over the electron donor level achieved by drying to constant weight.

12 Claims, No Drawings

PROCESSES FOR PREPARING POLYETHYLENE CATALYSTS BY HEATING CATALYST PRECURSORS

BACKGROUND OF THE INVENTION

1. Field of the Invention

This invention relates to a process for improving the productivity of catalysts used in processes for the polymerization of ethylene and the copolymerization of ethylene with alpha-olefins.

2. Prior Art

U.S. Pat. No. 4,302,565 to Goeke et al. describes high activity catalysts prepared by forming a precursor from at least one titanium compound, at least one magnesium compound and at least one electron donor compound; impregnating said precursor on a support; and activating said impregnated precursor with an organoaluminum compound. Other U.S. Pat. Nos. such as 4,395,359, 4,379,759, 4,354,009, 4,293,673, 4,376,062, 4,303,771, 4,383,095 and 4,379,758 also teach catalyst precursors formed by combining magnesium compounds, titanium compounds and electron donor compounds followed by precursor activation.

The prior art indicates that heating such catalyst precursors above a certain temperature range has a negative effect on catalyst productivity. U.S. Pat. No. 4,427,573 to Miles et al., for example, teaches at page 17 (Table III) that heating at temperatures over 120° C would have a deleterious effect on productivity.

Surprisingly, it has now been found that heating Ti(III) based precursors within a narrow elevated temperature range to remove a specified amount of the electron donor significantly increases catalytic activity.

BRIEF SUMMARY OF THE INVENTION

In accordance with the present invention, it has now been discovered that ethylene polymers can be obtained in enhanced yield in polymerization processes employing a catalyst system comprising:

(a) a solid titanium(III)-containing precursor, and
(b) an organoaluminum activator compound, by heating the solid titanium-containing precursor at a temperature of about 140°–200° C. for a sufficient time to reduce the electron donor level of the precursor by at least 20 to 80 percent below the electron donor level achieved by drying to constant weight, as discussed herein, prior to activating with the organoaluminum activator.

Heat treatment of the solid titanium containing precursor reduces the amount of electron donor in the precursor and consequently reduces the amount of activator required to preactivate the precursor in those polymerizations where such preactivation is employed, e.g., in fluid bed polymerizations. The presence of activator in the precursor due to such preactivation is associated with undesirable odor and color in the final polymer product.

DETAILED DESCRIPTION OF THE INVENTION

This invention provides a process for improving the catalytic activity of certain titanium containing catalysts used in the polymerization of ethylene by heating the titanium-containing precursors used in the production of these catalysts from 140° C. to 200° C., preferably from 150° C. to 175° C., for a sufficient time to reduce electron donor levels by at least 20 to 80 percent below the electron donor level achieved by drying to constant weight. Further advantages associated with such reduction in electron donor content include the need for less activator in any preactivation step, which activator adversely affects color and odor of the final product.

This invention contemplates the homopolymerization of ethylene and the copolymerization of ethylene with alpha monoolefins having 3 to 8 carbons.

High Activity Catalyst

The compounds used to form the high activity catalyst used in the present invention comprise at least one titanium compound, at least one magnesium compound, at least one electron donor compound, at least one activator compound and at least one porous inert carrier material, as defined below.

The titanium compound(s) has the structure $$TiX_3$$

wherein X is selected from the group consisting of Cl, Br, I or mixtures thereof. Also useful are titanium compounds admixed with aluminum halide such as $TiX_3 \cdot 1/3AlX_3$. The preferred titanium compound is $TiCl_3 \cdot 1/3AlCl_3$.

$TiX_4$ based precursors do not show the activity advances associated with the present invention. Precursors prepared using Ti(IV) compounds show a loss of activity when heated according to the process of the invention.

The magnesium compound(s) has the structure $$MgX_2$$

wherein X is selected from the group consisting of Cl, Br, I or mixtures thereof. Such magnesium compounds can be used individually or in combination thereof and would include $MgCl_2$, $MgBr_2$ and $MgI_2$. Anhydrous $MgCl_2$ is the particularly preferred magnesium compound.

About 0.5 mol to about 56 mols, and preferably about 1 mol to about 10 mols, of the magnesium compound(s) are used per mol of the titanium compound(s) in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are soluble. The electron donor compounds are known, as such, or as Lewis bases.

Suitable electron donor compounds include alkyl esters of aliphatic and aromatic carboxylic acids, aliphatic ethers, cyclic ethers and aliphatic ketones. Among these electron donor compounds the preferable ones are alkyl esters of saturated aliphatic carboxylic acids containing 1 to 4 carbon atoms; alkyl esters of aromatic carboxylic acids containing from 7 to 8 carbon atoms; aliphatic ethers containing from 2 to 8 carbon atoms, preferably from 4 to 5 carbon atoms; cyclic ethers containing from 4 to 5 carbon atoms, preferably mono- or di-ethers containing 4 carbon atoms; and aliphatic ketones containing from 3 to 6 carbon atoms, preferably from 3 to 4 carbon atoms. The most preferred of these electron donor compounds would include methyl formate, ethyl acetate, butyl acetate, ethyl ether, tetrahydrofuran, dioxane, acetone and methyl isobutyl ketone. An especially preferred donor is tetrahydrofuran (THF).

The electron donor compounds can be used individually or in combination thereof.

About 2 mols to 85 mols, and preferably about 3 mols to about 10 mols, of the electron donor compound are used per mol of Ti.

The activator compound has the structure $$Al(R)_c X'_d H_e$$

wherein X' is Cl or OR', R and R' are the same or different and are saturated hydrocarbon radicals containing from 1 to 14 carbon atoms, d is 0 to 1.5, e is 1 or 0 and $c+d+e=3$.

Such activator compounds can be used individually or in combination thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

Especially preferred activator compounds are tri-n-hexylaluminum (TNHAL), diethylaluminum chloride (DEAC), or a combination of the two.

About 0.1 mol to 400 mols, and preferably about 1 mol to about 100 mols, of the activator compound are used per mol of the titanium compound in activating the catalysts employed in the present invention.

The carrier materials employed to dilute the precursor composition are solid, particulate porous materials which are inert to the other components of the catalyst composition, and to the other active components of the reaction system. These carrier materials include inorganic materials such as oxides of silicon and/or aluminum. The carrier materials are used in the form of dry powders having an average particle size of about 10 microns to about 250 microns, and preferably of about 50 microns to about 150 microns. These materials are also porous and have a surface area of at least 3 square meters per gram, and preferably at least 50 square meters per gram. Catalyst activity or productivity can apparently be improved by employing a silica support having average pore sizes of at least 80 Angstrom units, preferably at least 100 Angstrom units. The carrier material should be dry, that is, free of absorbed water. Drying of the carrier material can be effected by heating, e.g., at a temperature of at least 150° C. Higher temperatures can be used to reduce surface OH groups in supports containing such groups. Temperatures of 150°–825° C. can be used with the preferred temperature range being 500°–800° C. To further reduce surface functionality, dried carrier material, such as silica, may be treated with about 1 weight percent to about 8 weight percent of one or more of the aluminum activator compounds described above. Modification of the support with an aluminum compound in this manner provides the catalyst composition with increased activity.

Catalyst Preparation

The catalyst precursor used in the present invention may be prepared by first preparing a solution of the titanium compound and the magnesium compound in the electron donor compound, and then impregnating them into an inert carrier material. After drying, the precursor is heated to reduce the electron donor content. It is then treated with an organoaluminum activator compound in one or more steps as described below.

The precursor is formed by dissolving at least one titanium compound and at least one magnesium compound in at least one electron donor compound at a temperature of from about 20° C. up to the boiling point of the electron donor compound. The titanium compound(s) can be added to the electron donor compound(s) before or after the addition of the magnesium compound(s), or concurrent therewith. The dissolution of the titanium compound(s) and the magnesium compound(s) can be facilitated by stirring, and in some instances by refluxing these two compounds in the electron donor compound(s). The solution of these components is impregnated into the carrier in a weight ratio range about 0.033:1 to 1:1, and preferably about 0.1:1 to 0.33:1, parts of magnesium/titanium/electron donor composite per part by weight of carrier material.

The impregnation of the dried support may be accomplished by dissolving the magnesium and titanium compounds in the electron donor compound, and by then admixing the support with the dissolved composition so as to allow the composition to impregnate the support. The solvent is then removed by drying to constant weight (the point at which electron donor compound is no longer removed) at temperatures up to about 85° C.

The inert carrier and the magnesium/titanium/electron donor precursor composition may also be mechanically mixed which mixing is effected by blending these materials together using conventional techniques. The blended ratio is also in a weight ratio range of about 0.033:1 to 1:1, and preferably about 0.1:1 to 0.33:1, parts of magnesium/titanium/electron donor composite per part by weight of carrier material.

When thus made as disclosed above the blended or impregnated precursor has the formula $$Mg_m TiX_p [ED]_q$$

wherein
X is selected from the group consisting of Cl, Br, I, and mixtures thereof,
ED is an electron donor compound,
m is 0.5 to 56, preferably 1.5 to 5,
p is 4 to 115, preferably 6 to 14, and
q is 3 to 85, preferably 3 to 10.

In accordance with the invention, the blended or impregnated precursor prepared as described above is subsequently heated at temperatures in the range of 140° to 200° C., preferably 150°–175° C., prior to activation. The precursor composition is kept at this temperature for a sufficient time to reduce electron donor levels by at least 20 percent to about 80 percent below the level achieved after drying to constant weight, more preferably 30 to 75 percent, and most preferably 50 to 75 percent. Generally heating times of 1 to 3 hours are sufficient, although longer or shorter times may be used. It has been observed that when lower temperatures are used, no electron donor may be removed and activity is unaffected; at higher temperatures, too much electron donor may be removed and activity drops.

Heating can be accomplished by any convenient means. The precursor can be heated in a vessel, preferably with agitation, or in a fluidized bed, or by being passed through a heated zone. It is preferred that a stream of inert gas be passed through the system but this is not necessary provided that the precursor is protected from oxygen and moisture. The removal of the electron donor can be carried out at any pressure from vacuum to above atmospheric, but atmospheric pressure is preferred.

Activation of Precursor

In order to be used in the process of the present invention the impregnated precursor composition must be fully or completely activated, that is, it must be treated with sufficient activator compound to transform the Ti atoms in the precursor to an active state.

If a fluid bed polymerization is used, it has been found that, in order to prepare a more useful catalyst it is necessary to conduct the activation in such a way that, at least the final activation stage must be conducted in the absence of solvent so as to avoid the need for drying the fully active catalyst to remove solvent therefrom. If polymerization is to be effected in solution or in a slurry, it is, of course, unnecessary to conduct the final activation of the precursor in the absence of solvent. In such polymerizations, activation may be conducted directly in the liquid polymerization medium.

Two procedures have been developed for fluid bed polymerizations to effect the final activation of the precursor in the absence of solvent.

In one procedure, the precursor is completely activated, outside the reactor, in the absence of solvent, by dry blending the impregnated precursor with the activator compound. In this dry blending procedure, the activator compound is used while impregnated in a carrier material. In this procedure the fully activated precursor is prepared without having to heat the composition above 50° C. prior to feeding it to the polymerization reactor.

In the second, and preferred of such catalyst activation procedures, the precursor is partially activated outside the polymerization reactor with enough activator compound so as to provide a partially activated precursor composition which has an activator compound/Ti molar ratio of greater than 0 but no more than 10, and preferably of about 0.5 to 8:1. This partial activation reaction is preferably carried out in a hydrocarbon solvent slurry followed by drying of the resulting mixture, to remove the solvent, at temperatures between 20° C. to 80° C., and preferably between 50° C. and 70° C. The resulting product can be readily fed to the polymerization reactor where the activation is completed with additional activator compound which can be the same or a different compound.

According to the invention, the reduced electron donor content provided by heat treatment of the precursor allows less activator to be used in this preactivation step, which results in an improvement in the color and odor of the final polymer product. The reduction in activator used is directly proportional to the reduction in electron donor caused by the heat treatment.

The additional activator compound and the partially activated precursor are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated precursor composition, a total Al/Ti molar ratio of at least 10 up to about 400, and preferably of about 15 to about 60. The additional amounts of activator compound added to the reactor react with, and complete the activation of, the titanium compound in the reactor.

The Polymerization Reaction

The ethylene polymerization is conducted in any polymerization reactor and process including solution, slurry, and gas phase using those procedures well established in the art. It is preferred that the polymerization occur using a continuous, fluidized bed process. Using such a procedure, portions of the catalyst composition and monomers are fed to a reactor vessel from which polyethylene product is continuously removed. The density of the polyethylene copolymer produced may be varied over a wide range depending upon the amount of alpha olefin comonomer addition and upon the particular comonomer employed. Higher alpha olefins may be added in a ratio of such olefin to ethylene of 0.00:1 to 8.0:1; the greater the mol percent of alpha olefin added the lower the density. Large mol percentages of alpha olefin also require a large mol percentage inert diluent gas, as discussed herein.

If polymerization is conducted in a fluid bed, it must be conducted at a temperature below the sintering temperature of the polyethylene. The operating temperature will range from between about 10° C. to about 115° C. for fluid bed or slurry polymerizations, and from 150° C. to 250° C. for solution polymerizations. Preferred operating temperatures will vary depending upon the polyethylene density which is desired. In fluid bed polymerizations, high density polyethylenes of greater than about 0.94 g/cc are produced at operating temperatures of between about 85° C. to about 115° C., and preferably at about 90° C. to about 100° C. Low density polyethylenes ranging in density from about 0.91 to about 0.94 g/cc are preferably produced at an operating temperature of between about 75° C. to about 90° C. Very low density polyethylenes of less than about 0.91 g/cc are preferably produced at an operating temperature of between about 10° C. to about 80° C. In the case of such very low density polyethylenes, it is necessary to dilute the reaction mixture with a large quantity of a diluent gas in order to prevent the formation of polymer agglomerates and sustain polymerization on a continuous basis, as described in copending U.S. patent application Ser. No. 587,005, entitled "Preparation of Low Density, Low Modulus Ethylene Copolymers in a Fluidized Bed", which disclosure is incorporated herein by reference.

Pressures of up to about 1000, and preferably between about 50 to about 350, psi may be employed for fluid bed, slurry or solution polymerizations.

A chain transfer agent, such as hydrogen, may be used to terminate the polymer chain. Usually the ratio of hydrogen to ethylene will vary between about 0.001 up to about 2.0 moles of hydrogen per mole of ethylene.

Inert gases may also be added to the reactor, particularly if a large mol percentage of copolymer is used, as is discussed in U.S. patent application Serial No. 587,005. Among such inert, diluent gases which may be used are nitrogen, argon, helium, methane, ethane, and the like.

EXAMPLES

The following specific examples and procedures are presented to illustrate the invention, but are not to be construed as limiting thereon.

| Definitions | |
|---|---|
| wt. % | weight percent |
| g | gram |
| mmol | millimole |
| hr | hour |
| psi | pounds per square inch gauge |
| $C_2H_4$ | ethylene |

Polymerizations of this invention were carried out in a one liter slurry reactor using 50 ml of hexane as the diluent. The polymerization conditions were 80°–85° C., 40 psi of $H_2$, and 150 psi total pressure. The ratio of triethylaluminum cocatalyst to titanium was 35:1 and run length was about 30 minutes.

EXAMPLE 1

Impregnation of Support with Precursor Prior to Heat Treatment

In a 12 liter flask equipped with a mechanical stirrer were placed 41.8 g (0.439 mol) of anhydrous $MgCl_2$ and 2.5 liters of tetrahydrofuran (THF). To this mixture, 29.0 g (0.146 mol) of $TiCl_3.0.33\ AlCl_3$ was added over a ¼ hour period. The mixture was then heated at 60° C. for another ½ hour in order to completely dissolve the material.

Five hundred grams (500 g) of silica was dehydrated by heating at a temperature of 600° C. and slurried in 3 liters of isopentane. The slurry was stirred while 186 ml of a 20 percent by weight solution of triethylaluminum in hexane was added thereto over a ½ hour period. The resulting mixture was then dried under a nitrogen purge at 60° C. over a period of about 4 hours to provide a dry, free flowing powder containing 5.5 percent by weight of the aluminum alkyl.

The treated silica was then added to the solution prepared as above. The resulting slurry was stirred for ½ hour and then dried under a nitrogen purge at 60° C. over a period of about 4 hours to provide a dry, impregnated, free-flowing powder. The THF content was 14.4 wt.%.

Heat treatment of the precursor to reduce electron donor content followed impregnation.

EXAMPLE 2

Preparation of Partially Activated Precursor Subsequent to Heat Treatment

The silica impregnated precursor composition prepared in accordance with Example 1 was slurried in 3 liters of anhydrous isopentane and stirred while a 20 percent by weight solution of diethylaluminum chloride in anhydrous hexane was added thereto over a ¼ hour period. The diethylaluminum chloride solution was employed in an amount sufficient to provide a 3.2 millimoles of this compound per mol of titanium in the precursor. After addition of the diethylaluminum chloride was completed, stirring was continued for an additional ¼ to ½ hour while a 20 percent by weight solution of tri-n-hexylaluminum in anhydrous hexane was added in an amount sufficient to provide 3.2 millimoles of this compound per mole of titanium in the precursor. The mixture was then dried under a nitrogen purge at a temperature of 65°±10° C. over a period of about 4 hours to provide a dry, free-flowing powder. This material was stored under dry nitrogen until it was needed.

EXAMPLE 3–4

In Examples 3 and 4 below, the precursor was heated prior to partial activation to temperatures within the range of the invention in order to reduce the electron donor content, e.g., tetrahydrofuran (THF) 20 to 80 percent and significant gains in productivity were observed compared to the control (Comparative Example A). At higher temperatures, or when electron donor is reduced in excess of 80 percent, productivity was greatly reduced (Comparative Examples B and C).

The temperature and duration of the heat treatment of the precursor is set forth in Table 1 below, along with the amount of electron donor reduction effected by such heat treatment and the productivity of the resulting catalyst.

TABLE 1

| Example | Temp, °C. | Time, hr | THF, wt % | Percent Reduction of Electron Donor | Productivity g/mmol Ti · hr · 100 psi $C_2H_4$) | |
|---|---|---|---|---|---|---|
| | | | | | Run 1 | Run 2 |
| Comparative Example A | No treatment | — | 14.4 | — | 2690 | 2710 |
| 3 | 140–150 | 3 | 4.9 | 66 | 4690 | 4030 |
| 4 | 170–180 | 2 | 3.7 | 74 | 4620 | 3690 |
| Comparative B | 205–225 | 1 | 2.3 | 84 | 1140 | 1780 |
| Comparative C | 180–240 | 0.75 | 1.5 | 90 | 570 | 580 |

As can be noted from Table I above, reduction in THF values of 20 to 80 percent over constant weight (Comparative Example A) by heating the precursors as indicated resulted in increased productivity (Examples 3 and 4).

COMPARATIVE EXAMPLE D

Comparative Example of Ti(IV) Based Precursor

A $TiCl_4$ containing precursor having the formula $Mg_3TiCl_{10}(THF)_8$ was prepared and heated in $N_2$ at 130° C. for 5 hours. The precursor was prepared as in example 1 except that $TiCl_4$ was used rather than $TiCl_3.0.33\ AlCl_3$. The precursor was then used to polymerize ethylene as described above. Productivity was 433 g/mmol Ti.hr.100 psi $C_2H_4$ as compared to 2200 g/mmol Ti.hr.100 psi $C_2H_4$ for unheated $TiCl_4$ containing precursor.

We claim:

1. A process for improving the productivity of catalysts used in process for homopolymerizing ethylene or copolymerizing ethylene with alpha monoolefins having 3 to 8 carbon atoms employing a catalyst system comprising:

(a) a solid, supported titanium (III)-containing precursor of the formula $$Mg_m TiX_p [ED]_g$$

wherein x is selected from the group consisting of Cl, Br, I and mixtures thereof, ED is an electron donor compound, m is 0.5 to 56, p is 4 to 115, g is 3 to 85; and (b) an organoaluminum activator, which process comprises heating the precursor, prior to activating said precursor with the organoaluminum activator, at a temperature of from about 140° C.-200° C. for a sufficient time to reduce the electron donor level of the precursor by at least about 20 percent to about 80 percent below the electron donor level achieved by drying to constant weight at a temperature up to about 85° C.

2. A process as in claim 1 wherein the solid titanium-containing precursor composition is formed by dissolving a titanium compound having the structure $$TiX_3$$

wherein X is selected from the group consisting of Cl, Br, I, or mixtures thereof, an a magnesium compound having the structure $$MgX_2$$

wherein X is selected from the group consisting of Cl, Br, I, or mixtures thereof, in an electron donor compound at a temperature of about 20° C. up to the boiling point of the electron donor compound and impregnating the resulting magnesium/titanium/electron donor composition in an inert porous carrier in a weight ratio of 0.033 to 1 part magnesium/titanium/electron donor composition to 1 part by weight of a carrier.

3. A process as in claim 2 wherein the carrier is an oxide of silicon and/or aluminum.

4. A process as in claim 2 wherein $TiX_3$ is $TiCl_3$.

5. A process as in claim 2 wherein the $TiX_3$ source is $TiCl_3.1/3AlCl_3$.

6. A process as in claim 2 wherein $MgX_2$ is $MgCl_2$.

7. A process as in claim 1 wherein the electron donor is selected from the group consisting of alkyl esters of aliphatic and aromatic carboxylic acids, aliphatic ethers, cyclic ethers and aliphatic ketones.

8. A process as in claim 7 wherein the electron donor is selected from the group consisting of alkyl esters of saturated aliphatic carboxylic acids containing 1 to 4 carbons, alkyl esters of aromatic carboxylic acids containing from 7 to 8 carbon atoms, aliphatic ethers containing from 2 to 8 carbon atoms, cyclic ethers containing from 4 to 5 carbon atoms, and aliphatic ketones containing from 3 to 6 carbon atoms.

9. A process as in claim 7 wherein the electron donor is tetrahydrofuran.

10. A process as in claim 1 wherein the organoaluminum activator has the structure $$Al(R)_c X'_d H_e$$

wherein X' is Cl or OR', R and R' are the same or different and are saturated hydrocarbon radicals containing 1 to 14 carbon atoms, d is 0 to 1.5, e is 1 or 0 and c+d+e eguals 3.

11. A process as in claim 10 wherein the organoaluminum activator is tri-n-hexylaluminum, diethylaluminum chloride or a combination of the two.

12. A process as in claim 1 wherein the precursor is heated 1 to 3 hours.

* * * * *